United States Patent [19]

Graham, III

[11] Patent Number: 5,142,487
[45] Date of Patent: Aug. 25, 1992

[54] NUMERICALLY CONTROLLED OSCILLATOR

[76] Inventor: Hatch Graham, III, 42078 Via San Luis Rey, Fremont, Calif. 94539

[21] Appl. No.: 664,479

[22] Filed: Mar. 4, 1991

Related U.S. Application Data

[63] Continuation of Ser. No. 471,439, Jan. 29, 1991, abandoned.

[51] Int. Cl.⁵ .................................. G06F 1/02
[52] U.S. Cl. .................................... 364/721
[58] Field of Search .................. 364/718, 721

[56] References Cited

U.S. PATENT DOCUMENTS

| | | | |
|---|---|---|---|
| 4,454,486 | 6/1984 | Hassun et al. | 364/721 |
| 4,602,545 | 7/1986 | Starkey | 364/723 X |
| 4,710,891 | 12/1987 | Debus, Jr. et al. | 364/718 |
| 4,992,743 | 2/1991 | Sheffer | 364/718 |

Primary Examiner—Long T. Nguyen

[57] ABSTRACT

A numerically controlled oscillator includes a phase accumulator which generates sequences of phase word phase signals. A demultiplexer 104 directs the odd and even numbered phase angle words of the sequence to identical but independent lookup tables to generate corresponding waveform signals. The wave form signals at the output of each lookup table occur at one-half the frequency of the system clock. A multiplexer 108 interleaves the output signals from the lookup tables to provide a properly ordered sequence of waveform signals at the frequency of the system clock. The maximum system clock frequency can be approximately twice the maximum operating frequency of each lookup table.

3 Claims, 2 Drawing Sheets

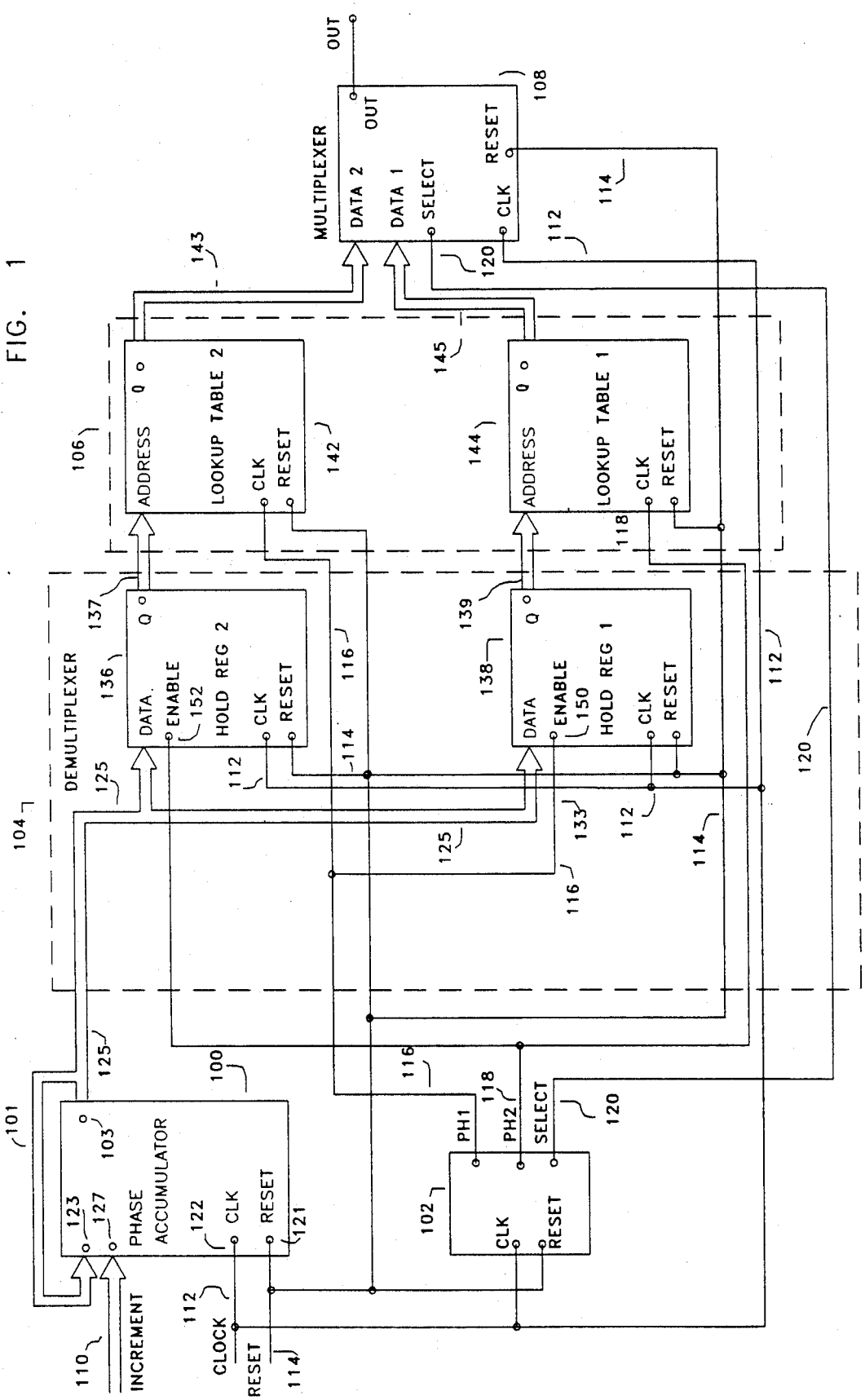

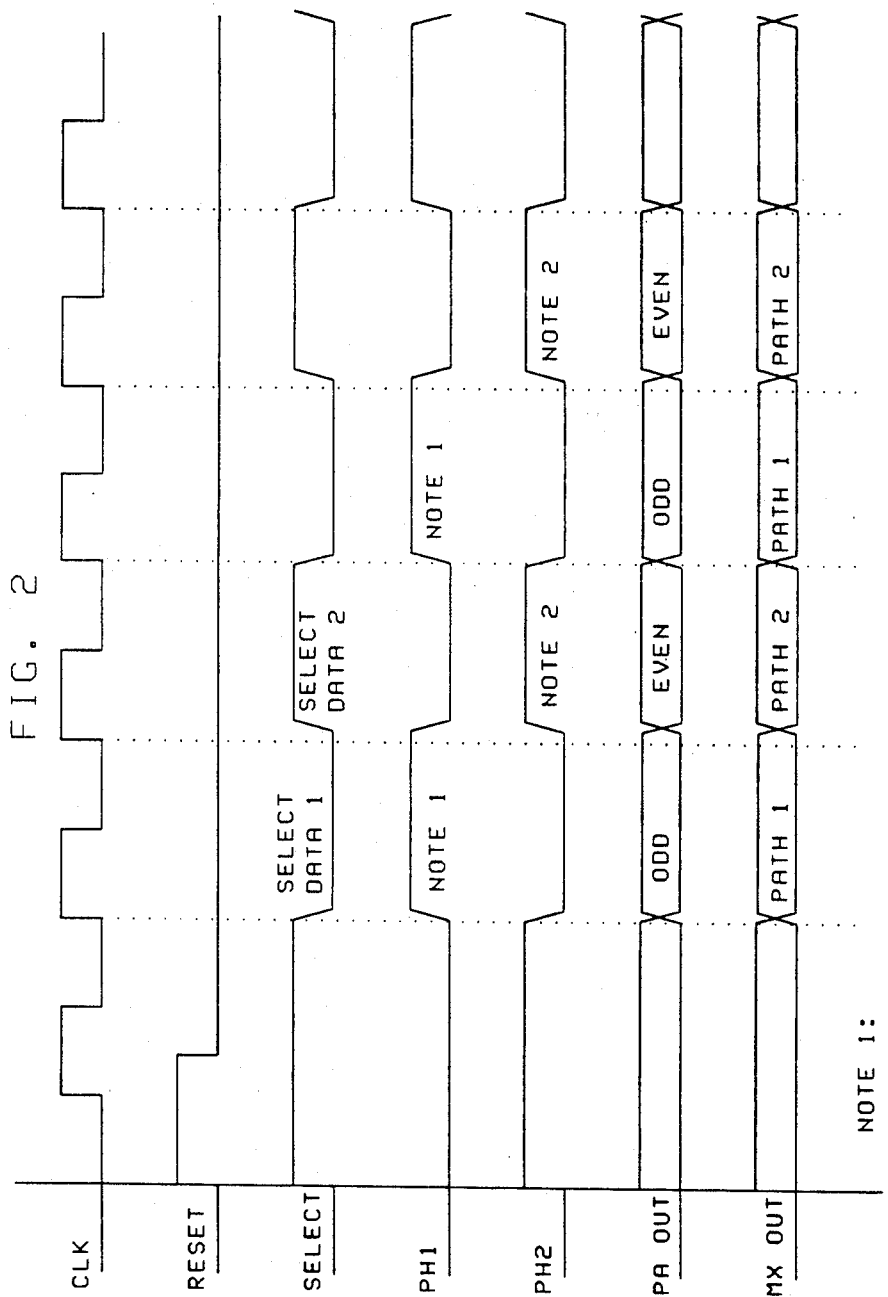

NUMERICALLY CONTROLLED OSCILLATOR

This application is a continuation of an application Ser. No. 471,439, filed Jan. 29, 1991 now abandoned.

TECHNICAL FIELD

This invention relates to Numerically Controlled Oscillators (NCO).

BACKGROUND OF THE INVENTION

Numerically controlled oscillators have been the subject of discussion in literature for many years. For example, an article entitled "A Digital Frequency Synthesizer" by Tierney, Rader and Gold was published in *IEEE Trans. Audio Electroacustics*, vol AU-19, pp 48–56 Mar., 1971. This article is illustrative of early interest in NCO circuits. However, prior to the availability of reasonably low cost integrated circuits, numerically controlled oscillators were too expensive for many applications. Integrated circuitry has reduced the cost of NCO circuits and has improved their performance. For example, there are commercially available NCO circuits which operate at clock rates up to 60 mHz. The output frequency of an NCO is a direct function of clock frequency; and the practical upper limit of output frequency of an NCO is about 45% of the clock frequency. Accordingly, there is substantial commercial incentive to increase clock frequency so as to reach new markets.

A numerically controlled oscillator comprises a "phase accumulator" which is incremented at the frequency of the clock signal to provide multibit digital word output signals in sequence.

In a typical application, the digital output words are employed to address a waveform lookup table i.e., a sine or cosine table in memory. The output signals of a lookup table (LUT) are series of digital words which correspond in value to the amplitudes of samples of the generated output signal. In such arrangements the speed of operation of the LUT limits the overall speed of operation of the system.

DISCLOSURE OF THE INVENTION

In accordance with our invention, a numerically controlled oscillator comprises: a phase accumulator for generating multibit digital accumulator output words in sequence at a system clock frequency; and a demultiplexer which transmits the odd numbered ones of the output words i.e., words 1, 3, 5, etc. to a first demultiplexer output port, and transmits the even numbered output words i.e., words 2, 4, 6, etc. to a second demultiplexer output port.

Advantageously, these arrangements permit an NCO in accordance with our invention to operate at approximately double the maximum operating frequency of the waveform lookup tables. In the illustrative example, clock frequencies up to a maximum of 120 mHz. are contemplated while using an integrated circuit fabrication process e.g., CMOS which is comparable to the process used to construct a prior art NCO which operates at 60 mHz. As indicated earlier herein, a doubling of the clock frequency, essentially doubles the maximum output frequency of an NCO. Construction of NCO's in other integrated circuit technologies yields identical performance enhancements.

In accordance with an aspect of our invention, a numerically controlled oscillator further comprises: identical first and second waveform lookup tables which have address input terminals connectable respectively to the first and second sets of demultiplexer output terminals.

In accordance with another aspect of our invention, we provide a multiplexer which has first and second input ports connected respectively to the outputs of the first and second lookup tables; a common output port; and means for multiplexing the output signals of the lookup tables at the output port.

In accordance with another aspect of our invention, the phase accumulator, the demultiplexer, the lookup tables, and the multiplexer are all constructed as an integrated circuit in any technology.

THE DRAWING

FIG. 1 is a schematic block diagram of a numerically controlled oscillator in accordance with our invention; and FIG. 2 illustrates the relationships of timing and control signals employed in FIG. 1.

DETAILED DESCRIPTION

The numerically controlled oscillator of FIG. 1 comprises: phase accumulator 100; control signal source 102; demultiplexer 104; lookup table system 106; and multiplexer 108.

In FIG. 1, the phase accumulator 100 comprises: an n-bit register (not shown); an n-bit increment input port 127; an n-bit adder (not shown) having a first input connected to the increment input port 127; a second input connected to receive the n-bit output of the register via bus 101 and input port 123; clock and reset terminals, 122 and 121; and an n-bit output (not shown) connected to the input of the register. The phase accumulator maintains a record of phase that is accurate to n bits. At each clock cycle, the value present on the increment bus 110, and thus at the increment input port 127, is added to the previous value in the accumulator register which is fed back to input port 123 from output port 103 via bus 101. The number in the phase accumulator 100 represents the latest calculated phase of a synthesized sine or cosine output signal. In the illustrative example of FIGS. 1 and 2, the value of "n" is thirty-two.

The reset signal on path 114 is an asynchronous signal which resets the phase accumulator and all registers in the NCO of FIG. 1.

All synchronous functions performed within the NCO are referenced to an edge of the clock signal on conductor 112. In this example, the rising edge is the reference. Preferably, the clock signal is a square wave. Advantageously, in accordance with our invention, the clock signal may have a maximum frequency of approximately twice the maximum operating frequency of each of the waveform lookup tables.

The timing relationships of the clock signal and various data and control signals employed in the NCO of FIG. 1 are illustrated in FIG. 2 for four representative clock cycles.

As indicated earlier herein, the reset pulse is asynchronous. The clock pulse shown in the first line of FIG. 2 may be provided from any stable signal source.

The control signal source 102, in response to reset and clock signals on conductors 114 and 112, generates PH1, PH2, and SELECT signals on conductors 116, 118, and 120. As will be described later herein, PH1 and PH2 signals on conductors 116 and 118 are employed in the demultiplexer 104 to select the odd and even numbered words in the phase accumulator output on bus 125; and SELECT signals on conductor 120 are used in the multiplexer 108 to select between data from the two lookup tables 142 & 144.

PH2 signals are also employed to clock data from HOLD REG 1 to LOOKUP TABLE 1; and PH1 signals are employed to clock data from HOLD REG 2 to LOOKUP TABLE 2.

In FIG. 2, the line labeled PA OUT illustrates the occurrence of odd and even numbered phase accumulator output words on bus 125.

In FIG. 1, demultiplexer 104 comprises: HOLD REGister 138 in path 1; and HOLD REGister 136 in path 2.

In cycle 1 of FIG. 2, it is shown that a high PH1 signal enables path 1 and that an odd numbered output word is present on bus 125 during that cycle. In FIG. 1, a high PH1 signal on conductor 116 provides a high signal at enable input terminal 150 of HOLD REG 1. The rising edge of the clock signal and a high PH1 signal serve to latch the m high order bits of the phase accumulator word on bus 125 into HOLD REG 1. In cycle 1 of FIG. 2, an odd numbered PA word is present on bus 125, therefore in cycle 1, the m high ordered bits of an odd numbered word are moved into HOLD REG 1. In the illustrative example of FIGS. 1 and 2, the value of "m" is thirteen.

In cycle 2 of FIG. 2, the high PH2 signal enables path 2 of the demultiplexer 104; and the rising edge of the PH2 signal moves the data in HOLD REG 1 to the input of LOOKUP TABLE 1.

In cycle 2 of FIG. 2, it is shown that a high PH2 signal enables path 2 and that an even numbered output word is present on bus 125 during that cycle. In FIG. 1, a high PH2 signal on conductor 118 provides a high signal at enable input terminal 152 of HOLD REG 2. The rising edge of the clock signal and a high PH2 signal serve to latch the m high ordered bits of the phase accumulator word on bus 125 into HOLD REG 2. In cycle 2 of FIG. 2, an even numbered PA word is present on bus 125, therefore in cycle 2, the m high ordered bits of an even numbered word are moved to HOLD REG 2.

In cycle 3 of FIG. 2, the high PH1 signal again selects path 1 of the demultiplexer 104; and the rising edge of the PH1 signal moves the data in HOLD REG 2 to the input of LOOKUP TABLE 2.

Lookup table system 106 comprise two identical lookup tables 142 and 144. In the illustrative embodiment of FIG. 1, the m high ordered bits of the odd numbered phase accumulator output words on bus 125 are transmitted to the address port of LOOKUP TABLE 1 to provide corresponding p-bit waveform signals at the Q output of table 144. The Q output of table 144 is connected to DATA 1 input of multiplex register 108 via bus 145. In the illustrative example of FIGS. 1 and 2, the value of "p" is twelve.

Similarly, the m high ordered bits of the even numbered phase accumulator output words on bus 125 are transmitted to the address port of LOOKUP TABLE 2 to provide corresponding waveform signals at the Q output of table 142; and to the DATA 2 input of multiplex register 108 via bus 143.

The p-bit waveform signals which appear at the DATA 1 and DATA 2 input terminals of multiplexer 108, are interleaved at the multiplexer output so that waveform samples corresponding to the phase accumulator output words appear in correct order. In multiplexer 108, the DATA 1 and DATA 2 inputs are selected by the output signal of Control Signal Source 102. A high SELECT lead on conductor 120 provides a high signal to select the DATA 1 input. Similarly, a low SELECT signal on conductor 120 serves to select the DATA 2 input.

It is to be noted that the p-bit waveform signals at the output of each lookup table appear at one-half the clock frequency; and that the waveform signals at the output of multiplexer 108 occur at the clock frequency.

In summary, in a numerically controlled oscillator in accordance with our invention, we process the odd and even numbered output words of a phase accumulator in separate and independent lookup tables; and we provide a multiplexer to interleave the waveform signals from the two lookup tables to provide a stream of properly ordered waveform signals. The invention has been described with particular attention to its preferred embodiment; however, it should be understood that variations and modifications within the spirit and scope of the invention may occur to those skilled in the art to which the invention pertains.

What is claimed is:

1. A numerically controlled oscillator comprising:
   a phase accumulator comprising: a multi-bit accumulator output port; and accumulating means for generating ordered sequences of multi-bit accumulator output words at said accumulator output port; said sequences each comprising alternate words and other words;
   a demultiplexer comprising: input terminal means coupled to said accumulator output port; first and second demultiplexer output terminal means; and distributing means for generating and transmitting signals corresponding to the alternate words of a received sequence of accumulator output words to one of said first and second demultiplexer output terminal means and for generating and transmitting signals corresponding to the other words of said received sequence accumulator output words to the other of said first and second demultiplexer output terminal means;
   first waveform lookup table means comprising: a first lookup table input port coupled to said first demultiplexer output terminal means; a first output port; means for generating first waveform data signals corresponding to signals received at said first lookup table input port; and means for transmitting said first waveform data signals to said first output port;
   second waveform lookup table means identical to said first lookup table means and comprising: a second lookup table input port coupled to said second demultiplexer output terminal means; a second output port; means for generating second waveform data signals corresponding to signals received at said second lookup table input port; and means for transmitting said second waveform data signals to said second output port; and
   a multiplexer comprising first and second multiplexer input ports connected respectively to said first and second output ports; a common output port; and coupling means for interleaving said first and said second waveform data signals in word sequence at said common output port.

2. A numerically controlled oscillator comprising:
   a phase accumulator comprising: accumulator output terminal means; and means for generating ordered sequences of accumulator parallel output words at said accumulator output terminal means;

a distributor comprising: input terminal means connected to said accumulator output terminal means; a plurality of distributor output terminal means; and means for distributing the words of received ordered sequences of accumulator output words in succession to said distributor output terminal means in repeating sequences;

a plurality of identical waveform lookup table means corresponding in number to said plurality of distributor output terminal means; each lookup table means comprising: an input port coupled to a corresponding one of said plurality of distributor output terminal means; an output port; and means for generating waveform data signals at said output port corresponding to accumulator output words received at said input port; and multiplexing means comprising; a plurality of input data ports corresponding in number to the plurality of lookup table means; each of said input data ports connected respectively to the output port of a corresponding one of said plurality of lookup table means; a common output port; and means for interleaving the waveform data signals of said plurality of lookup table means in word sequence at said common output port.

3. A numerically controlled oscillator comprising:

a phase accumulator comprising: a multi-bit accumulator output port; and accumulating means for generating ordered sequences of multi-bit accumulator output words at said accumulator output port;

a demultiplexer comprising: first input terminal means coupled to said accumulator output port; first and second output terminal means; and means for transmitting signals corresponding to every other word of a sequence of accumulator output words received at said first input terminal means to one of said first and second output terminal means and for transmitting signals corresponding to the other words of said sequence of accumulator output words received at said first input terminal to the other of said first and second output terminal means;

a first waveform lookup table means comprising: a first lookup table input port coupled to said first output terminal means; a first output port; means for generating first waveform data signals corresponding to accumulator output words received at said first lookup table input port; and means for transmitting said first waveform data signals to said first output port;

a second waveform lookup table means comprising: a second lookup table input port coupled to said second output terminal means; a second output port; means for generating second waveform data signals corresponding to accumulator output words received at said second lookup table input port; and means for transmitting said second waveform data signals to said second output port; and a multiplexer comprising first and second multiplexer input ports connected respectively to said first and second output ports; a common output port; and distributing means for interleaving said first and said second waveform data signals in word sequence at said common output port.

* * * * *

UNITED STATES PATENT AND TRADEMARK OFFICE
CERTIFICATE OF CORRECTION

PATENT NO : 5,142,487
DATED : August 25, 1992
INVENTOR(S): Hatch Graham III and Howard J. Gannes It is certified that error appears in the above-identified patent and that said Letters Patent is hereby corrected as shown below:

Title page, item (76):

Howard J. Gannes is added as a joint inventor with Hatch Graham III

Signed and Sealed this

Twenty-eighth Day of September, 1993

*Attest:*

BRUCE LEHMAN

*Attesting Officer*     Commissioner of Patents and Trademarks